(12) United States Patent
Sargent et al.

(10) Patent No.: US 9,720,469 B2
(45) Date of Patent: Aug. 1, 2017

(54) SYSTEM AND METHOD FOR AUTO-DISCOVERY AND MAPPING OF NETWORKED MODULES

(71) Applicant: VEEDIMS, LLC, Pompano Beach, FL (US)

(72) Inventors: Andrew P. Sargent, Chittenden, VT (US); Jeffrey N. Seward, Fairfax, VT (US); Jonathan S. Fick, Westford, VT (US)

(73) Assignee: Veedims, LLC, Fort Lauderdale, FL (US)

( * ) Notice: Subject to any disclaimer, the term of this patent is extended or adjusted under 35 U.S.C. 154(b) by 376 days.

(21) Appl. No.: 13/645,492

(22) Filed: Oct. 4, 2012

(65) Prior Publication Data

US 2013/0173940 A1    Jul. 4, 2013

Related U.S. Application Data

(60) Provisional application No. 61/542,889, filed on Oct. 4, 2011.

(51) Int. Cl.
*G06F 1/00* (2006.01)
*G06F 1/26* (2006.01)
(Continued)

(52) U.S. Cl.
CPC .......... *G06F 1/26* (2013.01); *G06F 1/00* (2013.01); *H04L 12/10* (2013.01); *H04L 45/02* (2013.01); *H04L 45/48* (2013.01)

(58) Field of Classification Search
CPC ..... G06F 1/00; G06F 1/32; G06F 1/26; G06F 1/28
(Continued)

(56) References Cited

U.S. PATENT DOCUMENTS

| 2,046,779 A | 7/1936 | Hack |
| 4,138,160 A | 2/1979 | Lohmeyer |

(Continued)

FOREIGN PATENT DOCUMENTS

| DE | 19526809 A1 | 1/1997 |
| DE | 10311396 A1 | 9/2004 |

(Continued)

OTHER PUBLICATIONS

Ethernet over twisted pair; Wikipedia, the free encyclopedia; Jun. 3, 2008; pp. 1-3; available at http://en.wikipedia.org/wiki/Ethernet_over_twisted_pair.

(Continued)

*Primary Examiner* — Jaweed A Abbaszadeh
*Assistant Examiner* — Keshab Pandey
(74) *Attorney, Agent, or Firm* — Howison & Arnott, LLP (57) ABSTRACT

A method of performing automated discovery and mapping of the topology of a network is provided, wherein the networked modules include discovery and mapping-enabled modules and standard modules that are not discovery and mapping-enabled and wherein the network connections include both data connections and power connections. The method comprises the following steps: a) powering up all discovery and mapping-enabled modules on the network with current trips set to maximum level; b) powering up all standard modules; c) determining what modules are on the network; d) determine the topology of the network, including where the modules are connected within the network; e) using the determined topology to determine power requirements for the modules on the network; and f) adjusting the power distribution on the network to accommodate the identified power needs of the network.

7 Claims, 5 Drawing Sheets

(51) Int. Cl.
*H04L 12/10* (2006.01)
*H04L 12/751* (2013.01)
*H04L 12/753* (2013.01)

(58) Field of Classification Search
USPC .................................................. 713/300–400
See application file for complete search history.

(56) References Cited

U.S. PATENT DOCUMENTS

| | | | |
|---|---|---|---|
| 5,352,026 A | 10/1994 | Snook | |
| 5,492,391 A | 2/1996 | Snook | |
| 5,533,794 A | 7/1996 | Faison | |
| 5,584,537 A | 12/1996 | Miansian | |
| 5,652,893 A * | 7/1997 | Ben-Meir et al. | 713/310 |
| 5,820,224 A | 10/1998 | Dimatteo, Jr. | |
| 5,941,105 A | 8/1999 | Macey | |
| 6,322,158 B1 | 11/2001 | Herrera | |
| 7,547,077 B2 | 6/2009 | Melberg et al. | |
| 7,585,031 B2 | 9/2009 | White et al. | |
| 7,733,800 B2 * | 6/2010 | Huibregtse | 370/254 |
| 2003/0015909 A1 | 1/2003 | Meek, Jr. | |
| 2007/0024117 A1 | 2/2007 | Boenker, IV et al. | |
| 2007/0030137 A1 | 2/2007 | Masters et al. | |
| 2007/0077058 A1 | 4/2007 | Kontani | |
| 2007/0096546 A1 | 5/2007 | Thomas et al. | |
| 2007/0137367 A1 | 6/2007 | Papa et al. | |
| 2008/0002420 A1 | 1/2008 | Lambert et al. | |
| 2008/0007961 A1 | 1/2008 | Mochizuki et al. | |
| 2008/0031004 A1 | 2/2008 | Chu | |
| 2008/0034209 A1 | 2/2008 | Dickinson et al. | |
| 2008/0157593 A1 | 7/2008 | Bax et al. | |
| 2008/0222844 A1 | 9/2008 | Broadhead et al. | |
| 2009/0011639 A1 | 1/2009 | Ballard et al. | |
| 2009/0016216 A1 | 1/2009 | Ballard et al. | |
| 2009/0223318 A1 | 9/2009 | Ballard | |
| 2009/0223437 A1 | 9/2009 | Ballard | |
| 2009/0223438 A1 | 9/2009 | Ballard | |
| 2009/0223757 A1 | 9/2009 | Ballard | |
| 2009/0223789 A1 | 9/2009 | Ballard | |
| 2009/0224895 A1 | 9/2009 | Ballard | |
| 2009/0267405 A1 | 10/2009 | Ballard | |
| 2009/0271949 A1 | 11/2009 | Sprague et al. | |
| 2009/0272313 A1 | 11/2009 | Ballard et al. | |
| 2009/0272589 A1 | 11/2009 | Ballard | |
| 2009/0273170 A1 | 11/2009 | Ballard et al. | |
| 2009/0273208 A1 | 11/2009 | Ballard et al. | |
| 2009/0273282 A1 | 11/2009 | Ballard et al. | |
| 2009/0273942 A1 | 11/2009 | Ballard et al. | |
| 2009/0274416 A1 | 11/2009 | Ballard | |
| 2009/0277707 A1 | 11/2009 | Ballard | |
| 2009/0289062 A1 | 11/2009 | Ballard | |
| 2009/0289757 A1 | 11/2009 | Ballard | |
| 2011/0022245 A1 * | 1/2011 | Goodrum et al. | 700/297 |
| 2011/0176428 A1 * | 7/2011 | Ballard et al. | 370/241 |
| 2011/0258464 A1 * | 10/2011 | Gammel et al. | G06F 1/266 713/300 |
| 2011/0320849 A1 * | 12/2011 | Cochran et al. | 713/340 |

FOREIGN PATENT DOCUMENTS

| | | |
|---|---|---|
| DE | 102004053238 A1 | 5/2006 |
| EP | 0507225 A | 10/1992 |
| EP | 1429348 A | 6/2004 |
| EP | 1493630 | 1/2005 |
| GB | 462033 A | 3/1937 |
| GB | 2203483 A | 10/1988 |
| JP | 5-169981 A | 7/1993 |

OTHER PUBLICATIONS

PCT: International Search Report and Written Opinion of PCT/US2009/059073 (related application); Jan. 22, 2010; 7 pgs.
PCT: International Search Report and Written Opinion of PCT/US2009/045063 (related application); Aug. 12, 2009; 7 pgs.
PCT: International Search Report and Written Opinion of PCT/US2009/043649 (related application); Aug. 10, 2009; 8 pgs.
PCT: International Search Report and Written Opinion of PCT/US2009/036322 (related application); Jun. 11, 2009; 8 pgs.
PCT: International Search Report and Written Opinion of PCT/US2009/036234 (related application); Dec. 21, 2009; 6 pgs.
PCT: International Search Report and Written Opinion of PCT/US2009/036190 (related application); Jul. 15, 2009; 8 pgs.
PCT: International Search Report and Written Opinion of PCT/US2009/036078 (related application); Apr. 15, 2009; 7 pgs.
PCT: International Search Report and Written Opinion of PCT/US2009/036073 (related application); May 16, 2009; 8 pgs.
PCT: International Search Report and Written Opinion of PCT/US2009/036001 (related application); Apr. 14, 2009; 12 pgs.
PCT: International Search Report and Written Opinion of PCT/US2009/035850 (related application); Apr. 15, 2009; 9 pgs.
PCT: International Search Report and Written Opinion of PCT/US2009/035844 (related application); Apr. 23, 2009; 7 pgs.
PCT: International Search Report and Written Opinion of PCT/US2009/035715 (related application); Apr. 29, 2009; 8 pgs.
PCT: International Search Report and Written Opinion of PCT/US2009/035626 (related application); Jun. 3, 2009; 7 pgs.
PCT: International Search Report and Written Opinion of PCT/US2009/035625 (related application); May 25, 2009; 9 pgs.
PCT: International Search Report and Written Opinion of PCT/US2009/035615 (related application); Jul. 14, 2009; 7 pgs.
PCT: International Search Report and Written Opinion of PCT/US2009/035614 (related application); Aug. 21, 2009; 10 pgs.
PCT: International Preliminary Report on Patentability of PCT/IB2008/002056 (related application); Dec. 7, 2009.
PCT: International Preliminary Report on Patentability of PCT/IB2008/002060 (related application); Dec. 7, 2009.
PCT: International Search Report and Written Opinion of PCT/IB2008/002056 (related application); Jan. 7, 2009; 9 pgs.
PCT: International Search Report and Written Opinion of PCT/IB2008/002060 (related application); Feb. 16, 2009; 12 pgs.
Vanderwerp, Dave, "2011 Dodge Circuit EV—First Drive Review." Jun. 2009; pp. 1-4; available at http://www.caranddriver.com/reviews/car/09q2/2011_dodge_circuit_ev-first_drive_review.

* cited by examiner

SYSTEM AND METHOD FOR AUTO-DISCOVERY AND MAPPING OF NETWORKED MODULES

CROSS-REFERENCE TO RELATED APPLICATIONS

This application claims benefit of U.S. Provisional Application No. 61/542,889, filed Oct. 4, 2011, and entitled SYSTEM AND METHOD FOR AUTO-DISCOVERY AND MAPPING OF NETWORKED MODULES.

TECHNICAL FIELD

The following disclosure relates to networks of interconnected modules including both data and power connections between the networked modules. In particular, it relates to improved systems and methods for organizing the connections between networked modules in a data/power network.

BACKGROUND

It is known to connect multiple devices (i.e., modules) into a data network for sharing data between the networked modules. It is also known to connect multiple modules into a power network for distributing power between the networked modules. It is still further known to connect multiple modules into a data and power (i.e., "data/power") network for sharing both data and power between the networked modules. In each type of network, the connections between modules must follow a prescribed topology in order for the network to function properly. In many cases, the design and implementation of data, power and/or data/power networks is complex. A need therefore exists for improved systems and methods for organizing the data and power connections between modules in order to form a data/power network.

SUMMARY

Systems and methods for auto-discovery and mapping of networked modules in a data and power network are provided. In one embodiment, a data and power network is mainly comprised of intelligent modules connected by cables that carry both data and power. Network data and power distribution through the network is facilitated by intelligent modules, named "Vhub" modules, which combine data switching as well as power management and distribution. The Vhub module is an intelligent managed switch combined with software-controlled power distribution. The Vhub module may control power distribution in the network using dynamic current limiting for each output and/or with monitoring of current and voltage of each output. The Vhub module, along with other intelligent modules, e.g., "Vpower" modules and "Vsensor" modules may also incorporate temperature and/or voltage and/or current monitoring of the module itself. The disclosed systems and methods make building a data/power network system as simple as possible. In preferred embodiments, simplification is achieved is by letting the intelligent modules manage the data and/or power connections within the network in such a way that the parts of the network can just be plugged together ("If it plugs—it works").

In some embodiments, there are two types of connections that need to be managed. The data network connections are managed using data switches supporting spanning trees. The power distribution connections are handled using knowledge of the topology gained from the data network to intelligently switch power to the various outputs of the intelligent modules, e.g., the Vhub modules.

In one embodiment, a method of performing automated discovery and mapping of the topology of a network is provided, wherein the networked modules include discovery and mapping-enabled modules and standard modules that are not discovery and mapping-enabled and wherein the network connections include both data connections and power connections. The method comprises the following steps: a) powering up all discovery and mapping-enabled modules on the network with current trips set to maximum level; b) powering up all standard modules; c) determining what modules are on the network; d) determine the topology of the network, including where the modules are connected within the network; e) using the determined topology to determine power requirements for the modules on the network; and f) adjusting the power distribution on the network to accommodate the identified power needs of the network.

In a further embodiment, the step b) powering up all standard modules further comprises the steps of: i) powering up a first connected module to a minimal level; ii) setting the power of the first connected module to a requested value; and iii) repeating steps i) and ii) for each subsequent module in a chain.

In a still further embodiment, the step b) powering up all standard modules further comprises the steps of: i) power up all connected modules in low power state; ii) determining if the hub module can supply full power to all connected modules; and iii) setting all connected modules to full power once it is determined that the hub module can supply full power.

In a still further embodiment, the step b) powering up all standard modules further comprises the step of using an extra pair of power conductors to power the electronics of the modules such that power requirements can be determined before powering up the entire module.

In another embodiment, the method further comprises the step of using the auto-discovery of the modules to feed the auto-configuration of the controllers and upper level systems.

In yet another embodiment, the method further comprises the step of continuously monitoring the network after initial discovery and mapping to determine if changes to the topology have occurred.

In yet another embodiment, the method further comprises responding to changes in the network topology by automatically reconfiguring the power and/or data connections of the network.

In another aspect, an intelligent module comprises a managed data switch combined with software-controlled electrical power distribution functionality and remotely accessible input-output sensor functionality as further described herein.

In another aspect, an intelligent module comprises a managed data switch module combined with an unmanaged electrical power distribution functionality and remotely accessible input-output sensor functionality as further described herein.

In another aspect, an intelligent module comprises a unmanaged data switch module combined with an unmanaged electrical power distribution functionality and remotely accessible input-output sensor functionality as further described herein.

BRIEF DESCRIPTION OF THE DRAWINGS

For a more complete understanding, reference is now made to the following description taken in conjunction with the accompanying Drawings in which.

DETAILED DESCRIPTION

Referring now to the drawings, wherein like reference numbers are used herein to designate like elements throughout, the various views and embodiments of a system and method for auto-discovery and mapping of networked modules are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

In one embodiment, a system and method are provided to implement a data and power network between modules, the network having the following characteristics:

1. The physical topology of the data and power connections formed within the network system may be a mesh, at least with respect to the power switching modules, e.g., Vhub and Vpower modules.
2. A dynamic logical spanning tree topology for the data network may be imposed on the mesh. Note: If the data network is designed to have a known tree structure, then the processes of imposing a tree structure on the data network connections may be omitted.
3. Network power distribution connections may be a mesh topology, or a tree network topology imposed on the mesh topology.
4. Connected devices (e.g., modules and other devices) may be electrically protected by current trips (i.e., circuit breakers or fuses, whether physical or software implemented).
5. The data and power network provided by the system may tolerate the disconnection or cutting of a cable (i.e., connection) where a second power and/or data connection exists.
6. The data and power network provided by the system may allow new modules to be dynamically added to the network.
7. The data and power network provided by the system may boot rapidly. In a preferred embodiment, the network will boot in less than 5 seconds.

Figure 1:
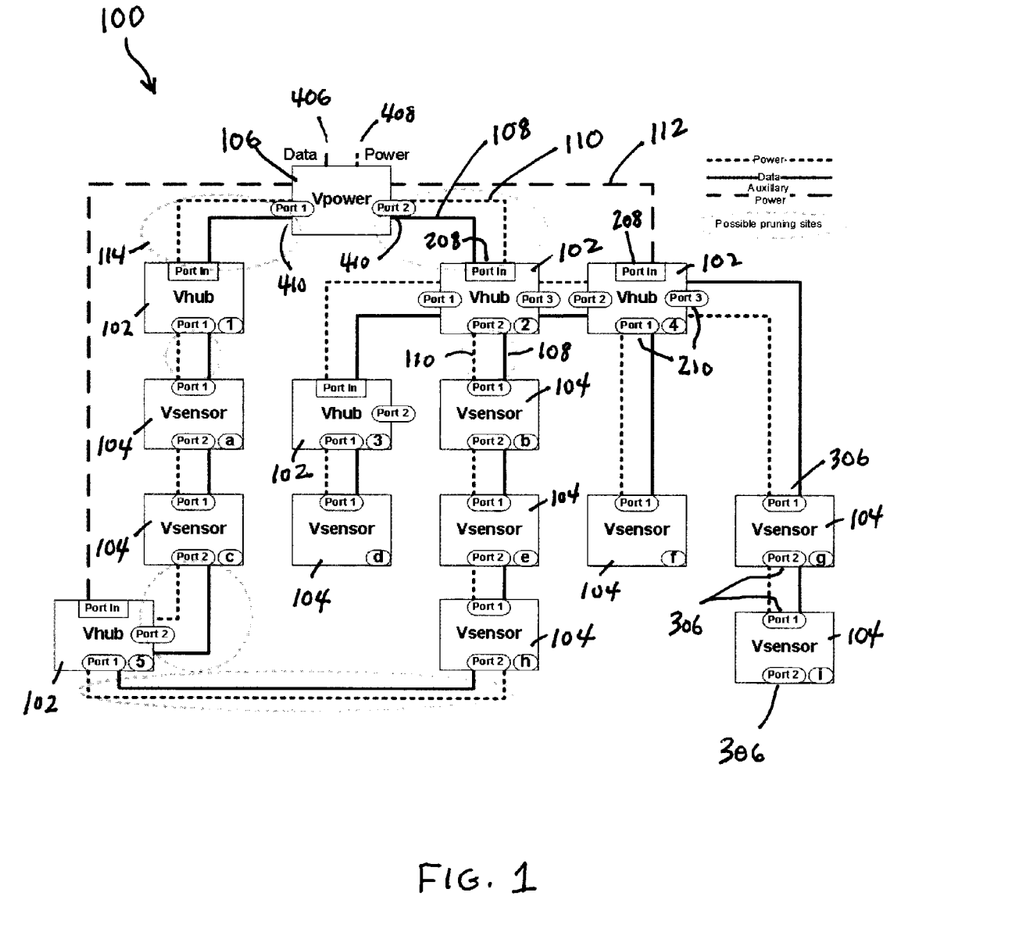
FIG. 1 illustrates a data/power network formed from a plurality of interconnected modules sharing data and power connections, and indicating possible connection pruning sites identified in accordance with one embodiment.

Referring now to FIG. 1, there is illustrated a data and power network implemented in accordance with one embodiment. The data/power network 100 comprises a plurality of modules, which in the illustrated embodiment include, but are not limited to, Vhub modules 102, Vsensor modules 104 and Vpower modules 106. The modules 102, 104, 106 are interconnected by data connections 108 (shown in solid line) and power connections 110 (shown in broken line). Optionally, auxiliary power connections 112 (shown in large broken line) may be provided between selected modules.

For purposes of illustration, the data and power connections 108, 110 in FIG. 1 are shown separately, but this should not be understood to mean that these connections must be physically separate. In some embodiments, the data and power connections 108, 110 between modules will be provided in a single cable, whereas in other embodiments, the data and power connections will be provided in separate cables. In some cases, the connection cables may utilize electrical conductors for both data and power transmission, e.g., using copper conductors, whereas in other cases, the data may be transmitted via optical fibers or other technology. In yet other embodiments, the data connections between some or all of the networked modules 102, 104, 106 may be made wirelessly (e.g., by Wi-Fi, Bluetooth, cellular network, infrared, etc.) while the power connections are provided via conventional cables.

It will be appreciated that the data/power network 100 illustrated in FIG. 1 does not have a tree topology, due at least to the loop formed by data connections 108 from Vpower module 106 to Vhub module 102(1) to Vsensor module 104(a) to Vsensor module 104(c) to Vhub module 102(5) to Vsensor module 104(h) to Vsensor 104(e) to Vsensor module 104(b) to Vhub module 102(2) and back to Vpower module 106. For many types of network data communication, such as Ethernet, such a loop may result in a network "packet storm" that will adversely affect network performance. Thus, "pruning" the network data connections 108 to break the loop is desirable. Numerous possible pruning sites 114 are indicated in FIG. 1.

Figure 2:
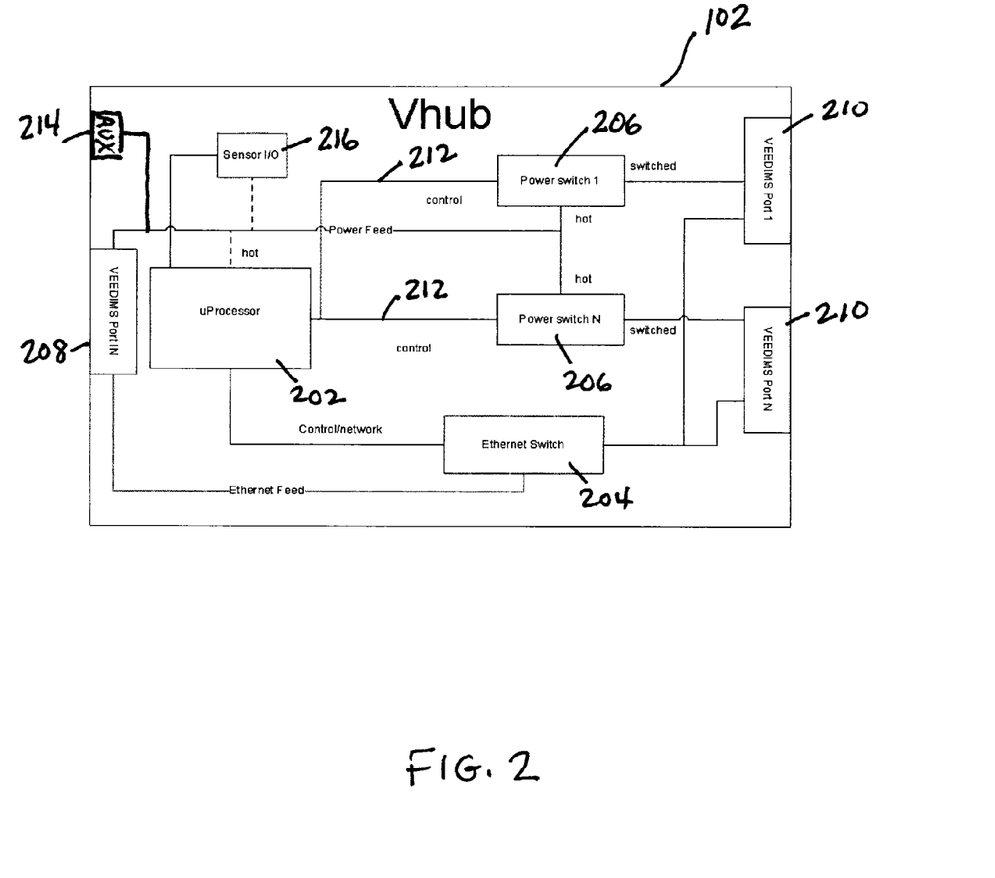
FIG. 2 illustrates the data/power network of FIG. 1 following pruning of selected connections.

Referring now to FIG. 2, there is illustrated a Vhub module 102 in accordance with another embodiment. The Vhub module 102 is an intelligent managed switch combined with software-controlled power distribution. Specifically, Vhub module 102 includes a microprocessor/controller 202, a data switch 204 (in this case, an Ethernet switch) and at least one power switch 206 (preferably multiple power switches). The Vhub module 102 further comprises a data and power input port 208 and one data and power output port 210 for each of the power switches 206. In preferred embodiments, the data and power input port 208 and output port(s) 210 each utilize integrated data/power connectors, termed "VEEDIMS" connectors. Thus, the illustrated Vhub module 102 includes a VEEDIMS input port 208 and two VEEDIMS output ports 210 (it being understood that additional output ports could be provided in similar fashion). In other embodiments, the data and power connectors comprising the input port 208 and/or the output port(s) 210 may be separate connectors. Further, as previously described, the data connections comprising the input port 208 and/or output port(s) 210 may be wireless rather than physical.

Referring still to FIG. 2, the data connection at the VEEDIMS input port 208 is operatively connected to the Ethernet switch 204, which in turn is operatively connected to the VEEDIMS output ports 210 such that bi-directional communications through the various ports are possible as with a conventional Ethernet switch. The Ethernet switch 204 is also connected to the microprocessor/controller 202 such that data communications to/from the microprocessor/controller are possible.

The power connection at the VEEDIMS input port 208 is operatively connected to the "hot" side of the power switches 206, and the "switched" side of each power switch is operatively connected to the power connection of the respective VEEDIMS output port 210. Control lines 212 from the microprocessor/controller 202 to the power switches 206 allow the microprocessor/controller to command the switches to turn "ON" or "OFF" or, in some embodiments, to variably control and/or limit the voltage and/or current provided to the switched line. In this manner, the Vhub module 102 may control power distribution in the data/power network using dynamic current limiting for each output port 210 and/or with monitoring of current and voltage of each output port. In preferred embodiments, the microprocessor/controller 202, data switch 204 and other components within the Vhub module 102 may receive their electrical power from the power connection of the input port 208; however, in other embodiments, some or all of these components may receive their power from external sources. In some embodiments, the Vhub module 102 may further include an auxiliary power connection 214 adapted to receive additional electrical power from auxiliary power connections 112 (FIG. 1). The auxiliary power connection 214 may be connected into the internal power (hot) line to provide additional power to the output ports 210 via the switches 206.

The Vhub module 102 may further comprise sensor input and output ("I/O") circuitry 216 that is connected to the microprocessor/controller 202. The sensor I/O circuitry 216 may be any type of sensor circuitry the user desires to interface into the network, including analog, digital and mixed signal sensors. These sensors may measure conditions or parameters within the Vhub module 102 itself (e.g., temperature or humidity) or conditions or parameters remote from the Vhub (e.g., connected via wires or other data link). Alternatively, the sensor I/O circuitry 216 may include active elements such as switches or relays that are controlled via the microprocessor/controller 202. The sensors I/O circuitry 216 may receive power from the Vhub, or it may be externally powered and have only data connections with the Vhub.

It will be appreciated that the microprocessor/controller 202 of the Vhub module 102 controls the local operation of the Vhub module 102, and further acts as an element of the overall network system. The microprocessor/controller 202 may include a central processing unit ("CPU"), a memory unit, an input/output ("I/O") device, and a network interface (these sub-components are not illustrated). These sub-components are interconnected (within the microprocessor/controller) by a transport system (e.g., a bus). A dedicated power supply may provide power to components of the controller system, such as the CPU and memory unit. It is understood that the microprocessor/controller system may be differently configured in different embodiments, and that each of the listed components may actually represent multiple components. For example, the CPU may actually represent a micro-controller, microprocessor, multi-processor or a distributed processing system; the memory unit may include different levels of cache memory, main memory, hard disks, and remote storage locations; the I/O device may include analog, digital, analog-to-digital and digital-to-analog circuitry for interfacing with components inside and outside the enclosure; and the network interface may include one or more network cards providing one or more connections (wired and/or wireless) to various digital communication networks. Therefore, a wide range of flexibility is anticipated in the configuration of the microprocessor/controller system 202.

The microprocessor/controller system 202 may use any operating system (or multiple operating systems), including various versions of operating systems provided by Microsoft Corp. (e.g., WINDOWS), Apple Corp. (e.g., Mac OS X and iOS), UNIX, and LINUX, and may include operating systems specifically developed for handheld devices, personal computers, and servers depending on the use of the microprocessor/controller system 202. The operating system, as well as other instructions, may be stored in the memory unit and executed by the CPU. As previously indicated, the microprocessor/controller system 202 illustrated in FIG. 2 is just one possible example; many other configurations are possible.

As further described below, the Vhub module 102 (and other intelligent modules of the system) have network discovery and mapping functionality and may act to change the configuration of the network by making or breaking data connections and/or power connections at various sites on the physical network. For example, following the discovery and mapping operations described herein, the system may cause a Vhub module 102 to "virtually" connect or disconnect a selected network data connection via commands to the Ethernet switch 204, or to connect or disconnect a power connection via commands to the power switch 206. In some embodiments, both of the corresponding data and power connections between modules may be made (i.e., turned ON) or broken (i.e., turned OFF) together, and in other embodiments, only one or the other of the connections may be made or broken.

Figure 3:
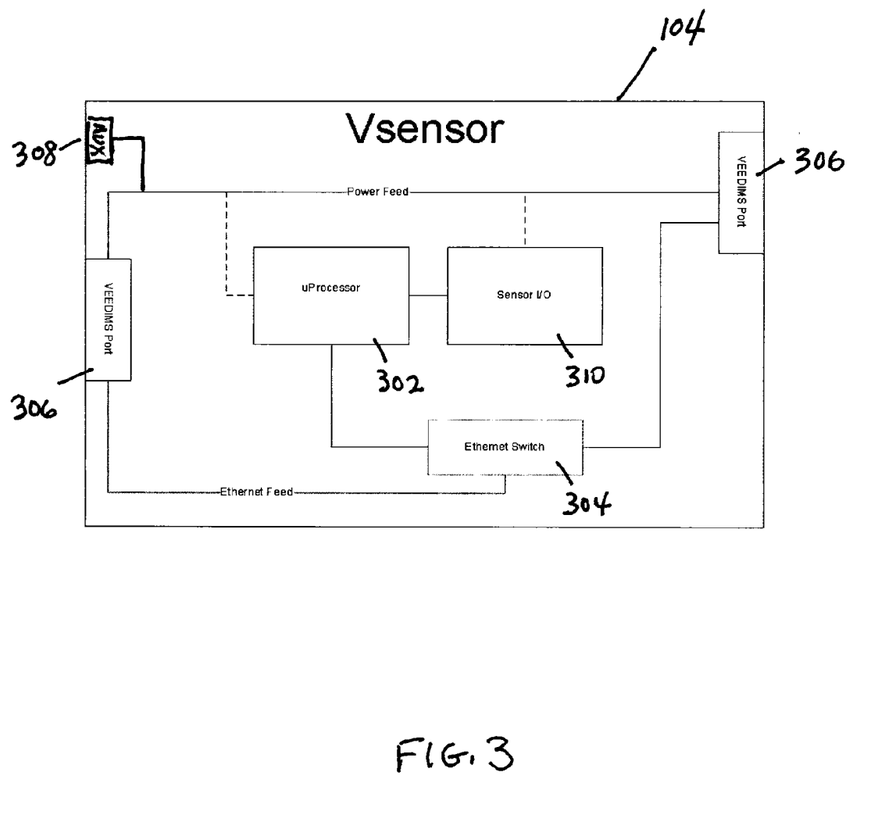
FIG. 3 illustrates an intelligent managed data and power switch module for use in a data/power network in accordance with another embodiment.

Referring now to FIG. 3, there is illustrated a Vsensor module 104 in accordance with another embodiment. The Vsensor module 104 is an intelligent device; however, it may not have the network discovery and mapping functionality of a Vhub module 102 or Vpower module 106. Further, it may not have the ability to reconfigure the network connections as a Vhub module 102 or a Vpower module 106 can. The Vsensor module 104 includes a microprocessor/controller 302 and a data switch 304 (in this case, an Ethernet switch). These components may be similar to those described (e.g., 202 and 204) for the Vhub module 102. The Vsensor module 104 further comprises at least one, and preferably multiple, data and power input/output ports 306. In preferred embodiments, the data and power input/output ports 306 each utilize integrated data/power connectors (e.g., VEEDIMS connectors). Thus, the illustrated Vsensor module 104 includes two VEEDIMS input/output ports 306 (it being understood that additional output ports could be provided in similar fashion). In other embodiments, the data and power connectors comprising the input/output ports 306 may be separate connectors. Further, as previously described, the data connections comprising the input/output ports 306 may be wireless rather than physical.

Referring still to FIG. 3, the data connections at the VEEDIMS input/output ports 306 of the Vsensor module 104 are operatively connected to the Ethernet switch 304 such that bi-directional communications through the various ports are possible as with a conventional Ethernet switch. The Ethernet switch 304 is also connected to the microprocessor/controller 302 such that data communications to/from the microprocessor/controller are possible.

The power connection at the VEEDIMS input/output ports 306 are operatively connected to one another ("passthrough"), since there is no power switching in the Vsensor module 104. In preferred embodiments, the microprocessor/controller 302, data switch 304 and other components within the Vsensor module 104 may receive their electrical power from the power connection of the input/output ports 306; however, in other embodiments, some or all of these components may receive their power from external sources. In some embodiments, the Vsensor module 104 may further include an auxiliary power connection 308 adapted to receive additional electrical power from auxiliary power connections 112 (FIG. 1). The auxiliary power connection 308 may be connected into the internal power line to provided additional power to the input/output ports 306.

The Vsensor module 104 may further comprise sensor I/O circuitry 310 that is connected to the microprocessor/controller 302. The sensor I/O circuitry 310 may be any type of sensor circuitry the user desires to interface into the network, including analog, digital and mixed signal sensors. These sensors may measure conditions or parameters within the Vsensor module 104 itself (e.g., temperature or humidity) or conditions or parameters remote from the Vsensor (e.g., connected via wires or other data link). Alternatively, the sensor I/O circuitry 310 may include active elements such switches or relays that are controlled via the microprocessor/controller 302. The sensor I/O circuitry 310 (i.e., if remotely located) may receive power from the Vsensor module 104, or it may be externally powered and have only data connections with the Vsensor module.

Figure 4:
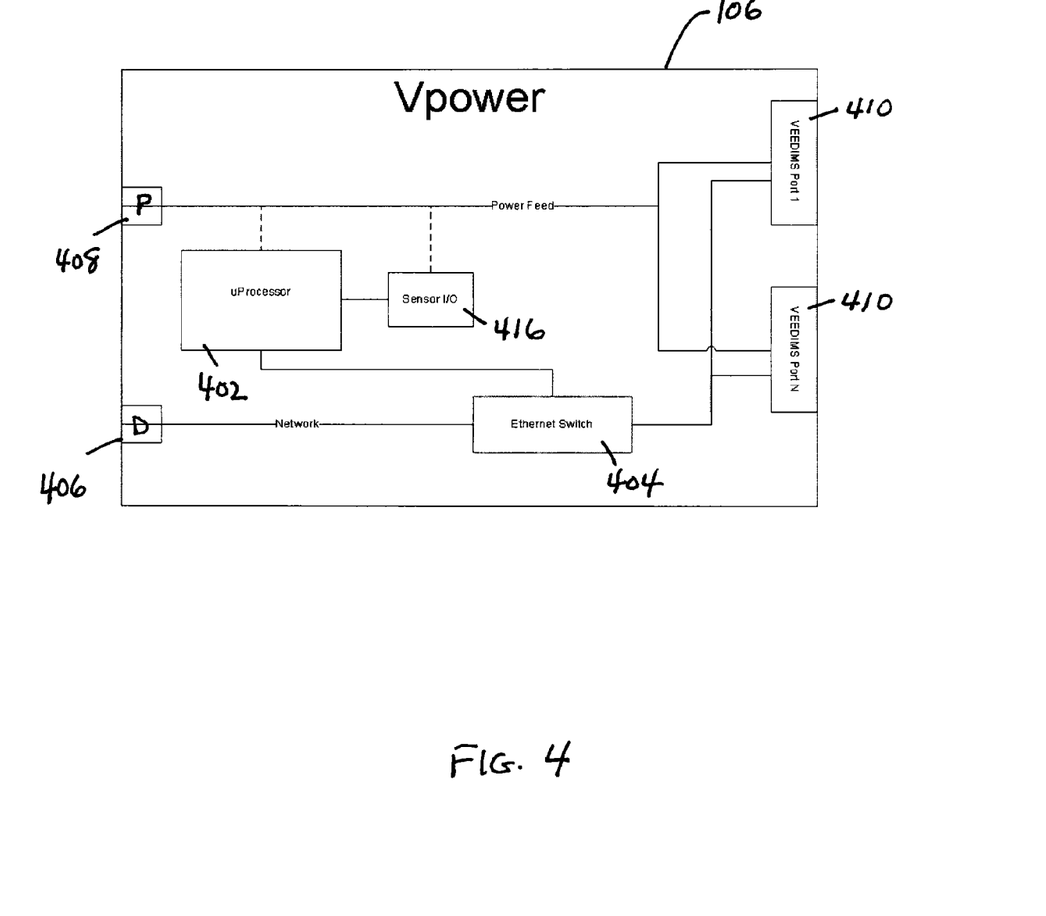
FIG. 4 illustrates an intelligent sensor module for use in a data/power network in accordance with yet another embodiment.

Referring now to FIG. 4, there is illustrated a Vpower module 106 in accordance with yet another embodiment. The Vpower module 106 is another intelligent device similar to the Vhub module 102; however, the Vpower module includes only a managed data switch and may not include the software-controlled power distribution functionality. The Vpower module 106 may be especially suitable for use an input point for data and power entering a network implemented according to this disclosure.

The Vpower module 106 includes a microprocessor/controller system 402 and a data switch 404 (in this case, an Ethernet switch). These components may be similar to those described (e.g., 202 and 204) for the Vhub module 102. The Vpower module 106 may further include a data only connection 406 and a power only connection 408, the power only connection including both an electrical power (i.e., "hot") conductor and a ground conductors. In preferred embodiments, all power lines 110, 112 of the network will include separate power ("hot") and ground conductors so that devices connected to the network have a reliable ground. For purposes of illustration, these separate hot and ground conductors may not be shown, but are instead represented by a single power line 110 or 112.

The Vpower module 104 further comprises at least one data and power output port 410, and preferably, multiple data and power output ports. In preferred embodiments, the data and power output port(s) 410 each utilize integrated data/power connectors (e.g., VEEDIMS connectors). Thus, the illustrated Vpower module 104 includes two VEEDIMS output ports 410 (it being understood that additional output ports could be provided in similar fashion). In other embodiments, the data and power connectors comprising the output port(s) 410 may be separate connectors. Further, as previously described, the data connections comprising the output port(s) 410 may be may be wireless rather than physical.

Referring still to FIG. 4, the data connection 406 is operatively connected to the Ethernet switch 404, which in turn is operatively connected to the VEEDIMS output ports 410 such that bi-directional communications through the various ports are possible as with a conventional Ethernet switch. The Ethernet switch 404 is also connected to the microprocessor/controller 402 such that data communications to/from the microprocessor/controller are possible. The power connection 408 is operatively connected (i.e., "pass-through") to the power connections of the VEEDIMS output ports 410. In preferred embodiments, the microprocessor/controller 402, data switch 404 and other components within the Vpower module 106 may receive their electrical power from the power connection of the power connector 408; however, in other embodiments, some or all of these components may receive their power from external sources.

The Vpower module 106 may further comprise sensor I/O circuitry 416 that is connected to the microprocessor/controller 402. The sensor I/O circuitry 416 may be any type of sensor circuitry the user desires to interface into the network, including analog, digital and mixed signal sensors. These sensors may measure conditions or parameters within the Vpower module 106 itself (e.g., temperature or humidity) or conditions or parameters remote from the Vpower module, e.g., connected via wires (not shown) or other data link. Alternatively, the sensor I/O circuitry 416 may include active elements such as switches or relays that are controlled via the microprocessor/controller 402. The sensors I/O circuitry 416 may receive power from the Vpower module, or it may be externally powered and have only data connections with the Vpower module.

As described in connection with the Vhub module 102, the Vpower module 106 has network discovery and mapping functionality and may act to change the configuration of the network by making or breaking data connections at various sites on the physical network. For example, following the discovery and mapping operations described herein, the system may cause a Vpower module 106 to "virtually" connect or disconnect a selected network data connection via commands to the Ethernet switch 404.

Figure 5:
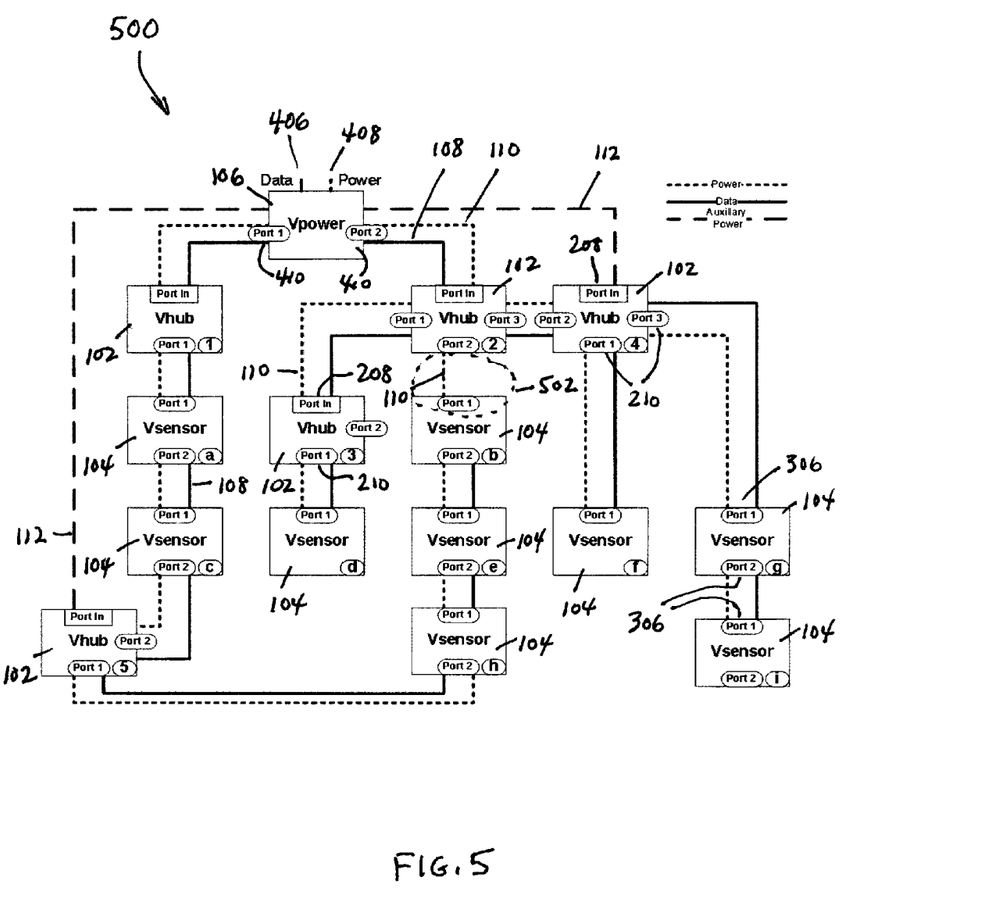
FIG. 5 illustrates an intelligent power distribution and data switch module for use in a data/power network in accordance with yet another embodiment.

Referring now to FIG. 5, in another embodiment, the system performs automated discovery and mapping (referred to as "ADAM") of a data/power network of modules. FIG. 5 illustrates a data/power network 500, similar to network 100 in FIG. 1, after implementation of the systems and methods described herein, and resulting in a data/power network having a tree topology for data communications and a mesh topology for power distribution. In particular, it can be seen that the data communication line 108 in the region designated 502 has been cut (i.e., either logically or electrically), while the power distribution line 112 is maintained. This allows the Vsensor modules 104(b), 104(e) and 104(h) to receive power from two sources, namely Vhub modules 102(2) and 102(5), while avoiding data loops that may result in packet storms or other network disruptions.

In preferred embodiments, the networked modules comprise intelligent modules such as the Vhub module 102, Vsensor module 104 and Vpower module 106. At a high level, the basic ADAM system functions as follows:

1. Power up discovery- and mapping-enabled modules. Each Vhub module in the network powers up with current trips set to maximum level, then proceeds with one of the following alternatives:
   a. Alternate action 1: Power up a first connected module to a minimal level, and then set to requested value before enabling the next module in a chain.
   b. Alternate action 2: Power up all connected modules in low power state, and then set to full power once it is determined that the hub module can supply full power.
   c. Alternate action 3: Use extra pair of power conductors to power electronics (low power).
2. Determine what modules are on the network.
3. Determine the topology, including where the modules are connected.
4. Use topology to determine power requirements.
5. Adjust power distribution to accommodate power needs.

6. Use the auto-discovery of the modules to feed the auto-configuration of the controllers and upper level systems.
7. Continuous monitoring polled to determine if changes to the topology have occurred.
8. Respond to changes by automatically reconfiguring power and network. Also update upper level systems.

In one preferred embodiment, the automatic discovery and mapping (ADAM) of the network topology for a data and power network is performed through the use of datagrams as described below. In this embodiment, the automatic discovery and mapping datagrams are referred to as ADAM datagrams, and the data and power network modules adapted to work with the ADAM datagrams are referred to as VEEDIMS modules. Other names may be used for these elements in other embodiments.

In preferred embodiments, one or more of the networked VEEDIMS modules (termed "mapping modules") are equipped with full ADAM capability, i.e., the intelligence to discover and map some or all of the data and power network, while the remaining networked VEEDIMS modules (termed "standard modules") support ADAM functionality but cannot themselves perform discovery and/or mapping. For example, Vhub modules 102 and Vpower modules 106 previously described may be considered mapping modules. The VEEDIMS mapping modules are adapted to transmit probe datagrams onto the network. The VEEDIMS network modules (both mapping and standard types) are adapted to listen on a pre-determined port for probe request datagrams. In the current embodiment, the VEEDIMS modules are always listening on port 0xADA3 for ADAM probe request datagrams. It will be appreciated that other ports may be used for probe requests in other embodiments. A probe consists of broadcasting (or, in some embodiments, sending to a specific address) a UDP datagram with "ADAM" or another predetermined string as the data to this port. Each ADAM probe datagram will include a datagram header and may (depending on the type of datagram) further include a datagram payload.

Referring now to Table 1, there is illustrated an example structure for an ADAM datagram header in accordance with one embodiment. The datagram header of this example includes 8 bytes. Starting at byte 0, a verify code is provided having a length of 4 bytes and a format type=string. The subject string in this case is "ADAM", which is the predetermined string that identifies the header as an ADAM datagram header. In other embodiments, another predetermined string may be used at this position. Starting at byte 4, a datagram type is provided having a length of 1 byte and a format type=char. The character at this position may be "?" to indicate "Request" or "D" to indicate "Data". Starting at byte 5, a reserved byte having a length of 1 byte is provided (i.e., reserved for future use). Starting at byte 6, a payload type is provided having a length of 1 byte and a format type=byte. The byte at this position may identify the ADAM datagram payload type according to a predetermined code schedule (e.g., see Table 2). Starting at byte 7, a payload version is provided having a length of 1 byte and a format type=byte. The byte at this position may identify the version of the datagram payload data. It will be appreciated that the order and/or length of the elements in the datagram header may be different in other embodiments.

TABLE 1

ADAM datagram header

| Start | Name | Length (bytes) | Format | Extra |
|---|---|---|---|---|
| 0 | Verify code | 4 | String | Always "ADAM" |
| 4 | Datagram type | 1 | Char | "?" = Request, "D" = Data |
| 5 | Reserved | 1 | Byte | reserved |
| 6 | Payload type | 1 | Byte | ADAM payload type (see table) |
| 7 | Payload version | 1 | Byte | Version of payload data |
| 8 | <-- Size of header | | | |

Referring now to Table 2, there is illustrated an example ADAM datagram payload type table in accordance with another embodiment. The datagram payload type table may be a table of codes for use in the ADAM datagram header (e.g., at byte 6) representing the available datagram payload types. In the illustrated embodiment: a code of 0 indicates a payload type=discovery (used to discover what modules are on the VEEDIMS network); a code of 10 indicates a payload type=mapping port (used to query what modules are on a given port); a code of 11 indicates a payload type=mapping master (used to register a master mapping listener); a code of 20 indicates a payload type=power (used to tell downstream devices that they are okay for full power); and a code of 200 indicates a payload type=diagnostic.

TABLE 2

ADAM datagram types

| Code | Type | Description |
|---|---|---|
| 0 | Discovery | Used to discover what modules are on the VEEDIMS network |
| 10 | Mapping Port | Query what modules are on a given port |
| 11 | Mapping Master | Register master mapping listener |
| 20 | Power | Used to tell downstream devices that they are OK for full power |
| 200 | Diagnostic | |

As previously indicated, each ADAM probe datagram may include a payload along with the header. Whether or not a payload is included depends on the type of probe datagram being sent. For example, a discovery-type ADAM probe (type 0) may not require a payload. However, other types of ADAM probe datagrams may require payloads of predetermined types.

Upon receiving an ADAM probe datagram, a VEEDIMS module may respond by sending a corresponding response datagram that includes a response header and may also include a response payload (depending on the type of the response datagram). The response datagrams are received and processed by the mapping-type VEEDIMS modules to extract the data/information necessary to discover and map the topology of the data and power network.

As previously mentioned, a discovery-type ADAM probe (type 0) may not require a payload. Upon receiving the type 0 probe datagram, VEEDIMS modules respond by assembling and sending a corresponding type 0 response datagram. The type 0 (discovery-type) ADAM response datagram requires a payload. Referring now to Table 3, there is illustrated an example structure for the payload of a discovery-type ADAM response datagram (type 0) in accordance with another embodiment.

Referring now to Table 3, there is illustrated an example ADAM discovery response payload (type 0) table in accordance with another embodiment. A discovery response datagram may be sent by any ADAM enabled module in response to receipt of a discovery probe (type 0) datagram. Alternatively, in some embodiments, discovery response datagrams may be sent out (i.e., unsolicited) by all ADAM enabled modules on a periodic basis, regardless of receipt of a discovery probe.

TABLE 3

ADAM discovery response payload - Type 0

| Start | Name | Length (bytes) | Format | Extra |
|---|---|---|---|---|
| 0 | IP Address | 4 | Byte | |
| 4 | Ethernet MAC Address | 6 | Byte | |
| 10 | Secondary MAC Address | 6 | Byte | If module has secondary NIC (i.e., Wi-Fi) |
| 16 | Probe received on port # | 1 | Byte | The switch port that the device received the probe request on; or if unsolicited, the switch port that the response was sent from |
| 17 | Supported Ports | 1 | Byte | Number of ports (1 = terminal module) |
| 18 | Mapping supported | 1 | Byte | Mapping supported: 1 = Yes, 0 = No |
| 19 | Module class | 1 | Byte | Class of module - see table below |
| 20 | Power requirement | 2 | Unsigned Int | Amps * 100 (e.g., 15.10A = 1510) |
| 22 | Version Major | 1 | Byte | Major version number |
| 23 | Version Minor | 1 | Byte | Minor version number |
| 24 | Build Time Year | 1 | Byte | Build year |
| 25 | Build Time Month | 1 | Byte | Build month |
| 26 | Build Time Day | 1 | Byte | Build day |
| 27 | Build Time Hour | 1 | Byte | Build hour |
| 28 | Module Name | 8 | String | 7 chars + Null Terminated |
| 36 | Application Name | 64 | String | 63 chars + Null Terminated |
| 100 | <-- Total length of payload | | | |

With respect to the data segment beginning at byte 20, only power required specifically by this module is reported. Power of downstream modules is not included in this number.

Referring now to Table 4, there is illustrated an example module class table for use with the discovery response payload.

TABLE 4

Module classes

| Code | Module Class | Description |
|---|---|---|
| 0 | Hub | Capable of hub functions. Participates in spanning tree, etc. |
| 1 | Power | Power distribution |
| 2 | Sensor | Sensor module |
| 3 | Actuator | Actuator module |
| 4 | Controller | Controller (logic and I/O controller) |
| 5 | Historian | Historical collection |
| 6 | Gateway | Interface to non-VEEDIMS bus or system (NMEA, CAN, etc.) |
| 7 | Test | Test System |

Referring now to Table 5, there is illustrated an example module name table for use with the discovery response payload.

TABLE 5

Module names

| Module Name | Description |
|---|---|
| Vhub | VEEDIMS distribution module |
| Vpower | VEEDIMS high power distribution module |
| Vhistorian | Historical collection |
| Vcontrol | Controller (logic and I/O controller) |
| Vfuel | Fuel sensor |
| Vmodem | Cellular gateway |
| Vvalve | Valve actuator |

Referring now to Table 6, there is illustrated an example ADAM mapping port probe payload—Type 10. This probe requests a list of modules discovered on a requested port.

TABLE 6

ADAM mapping port probe payload - Type 10

| Start | Name | Length (bytes) | Format | Extra |
|---|---|---|---|---|
| 0 | Port | 1 | Byte | Port to return module list for |
| 1 | Reserved | 1 | Byte | Reserved |
| 2 | <-- Total length of payload | | | |

Referring now to Table 7, there is illustrated an example ADAM mapping port response payload—Type 10. Multiple records will be sent if more than ~230 records (UDP datagram size limit).

TABLE 7

ADAM mapping port response payload - Type 10

| Start | Name | Length (bytes) | Format | Extra |
|---|---|---|---|---|
| 0 | Port | 1 | Byte | Port that results are for |
| 1 | Number of modules | 1 | Byte | Number of Modules (−1 = mapping not supported) |
| 2 | Ethernet MAC Address 1 | 6 | Byte | MAC Address of module |
| Additional records as needed | | | | |
| 2 + (N − 1) * 6 | Ethernet MAC Address N | 6 | Byte | MAC Address of module |
| 2 + N * 6 | <-- Total length of payload | | | |

Referring now to Table 8 there is illustrated an example ADAM mapping master probe payload—Type 11. This probe sets the poll rate for discovery/mapping for mapping modules such as Vhub/Vpower modules.

TABLE 8

ADAM mapping master probe payload - Type 11

| Start | Name | Length (bytes) | Format | Extra |
|---|---|---|---|---|
| 0 | IP Address | 4 | Byte | IP Address of master module |
| 4 | Poll rate | 1 | Byte | Rate to perform discovery probes |
| 5 | Reserved | 1 | Byte | Reserved |
| 6 | <-- Total length of payload | | | |

Referring now to Table 9, there is illustrated an example ADAM mapping master response payload—Type 11—Unsolicited.

TABLE 9

ADAM mapping master response payload - Type 11 - unsolicited

| Start | Name | Length (bytes) | Format | Extra |
|---|---|---|---|---|
| 0 | IP Address | 4 | Byte | IP Address of Vhub/Vpower module |
| 4 | Notification Code | 2 | Int | Code for notification |
| 6 | IP of Affected Module | 4 | Byte | IP address of affected module |
| 10 | Data | N | Byte | Extra notification message data |

N + 10 <-- Total length of payload

This message is sent as an unsolicited event notification anytime one of the notification conditions arises.

Referring now to Table 10, there is illustrated an example notification codes table for the mapping master response payload.

TABLE 10

Notification codes

| Code | Notification Code | Description |
|---|---|---|
| 0 | Discovered | Discovery cycle completed |
| 1 | Mapped | Mapping process complete |
| 2 | New Module | A new module has been discovered |
| 3 | Module Lost | Module no longer available |
| 100 | Error | Error codes start at 100 |

Referring now to Table 11, there is illustrated an example ADAM power acknowledge probe payload—Type 20.

TABLE 11

ADAM power acknowledge probe payload - Type 20

| Start | Name | Length (bytes) | Format | Extra |
|---|---|---|---|---|
| 0 | Power OK | 1 | Byte | 1 = Full power OK, 0 = Insufficient Power |
| 1 | Power available | 1 | Byte | Percent of full power |
| 2 | <-- Total length of payload | | | |

If the Vhub module is unable to supply full power to downstream modules, then it informs them of the shortfall at which time, they can request less power and operate in a lower power mode. If the full power requested by all downstream modules is available, then they are notified that full power operation is allowed. A response datagram is not used for the ADAM power acknowledge response payload—Type 20.

In accordance with another embodiment, a spanning tree process is provided by the system. The process makes the following assumptions:
1. Spanning Tree support is only required for Vhub/Vpower modules.
2. Pruning can only occur on the output ports of modules that support Spanning Tree (e.g., Vhub/Vpower modules). Pruning may or may not include power connections along with data connections.

Referring again to FIG. 1, the possible pruning sites 114 for the example network 100 are indicated by broken-line ovals.

After the Spanning Tree process is complete (assuming the process was required as previously discussed), the discovery process is initiated. The discovery process determines what modules are connected to the system and, optionally, sets the correct power trips for each port on each Vhub/Vpower module. Before discovery can take place, the spanning tree pruning must be completed.

The steps of the discovery process are as follows:
1. It is assumed that Spanning Tree Algorithm has already run, if applicable.
2. Then perform one of the following alternatives:
   a. Alternative 1: Each VEEDIMS module (mapping- and standard-types) sends out a discovery datagram every N seconds.
   b. Alternative 2:
      i. Vhub/Vpower module sends Discovery Probe datagram. The probe is intended to be sent out every N seconds (see note below) by the Vhub/Vpower Modules which are responsible for ADAM discovery and mapping.
      ii. VEEDIMS modules within the broadcast net must respond with Discovery Response datagrams.
3. Vhub/Vpower modules match each responding module's MAC to the module's MAC table to determine which port the responding device is reachable on.
4. For each of the Vhub/Vpower module ports, it constructs list of all responding modules containing the information returned from each module.

The above process is repeated every N seconds where N is set by the ADAM Mapping Master Probe in the poll field. Only ports with a change to the discovered modules will result in further processing.

Power management functionality (e.g., power trip setting) is an optional feature of the VEEDIMS system. Power trip setting, as described in this disclosure, applies to systems where there is no auxiliary power or redundant power feeds such as in the case of a loop connected topology.

Power is set based on all downstream modules for each port, so needs to be done with full list before pruning in the mapping process.

The discovery process then continues from the list of steps above:
5. Vhub module sets power limits based on the sum of the power requirements returned by modules on each port.
6. It checks to make sure the sum is less than or equal to the current rating of the port. The lower of the sum or rating is used.
7. Vhub module sends a Power Acknowledge Probe to downstream modules on each port notifying them that it is either OK to run full power or that they must run in low power state. In severe power shortage conditions, the Vhub module may switch off port power to a chain.
8. At this point the system is up and operational and the system is fully aware of all modules.
9. Send Mapping Master a notification that discovery is complete for this module.

A VEEDIMS data/power network system in accordance with some embodiments can be physically connected in loops such that power and data can be fed from more than one source. In such cases, as noted above, a tree structure must be imposed on the data network for proper operation of the underlying Ethernet physical layer. If other communications physical layers are used which do not require a tree topology, such as a mesh network, this requirement can be lifted.

If the VEEDIMS system is connected in a loop or other redundant topology, then power must be managed to avoid issues with voltage differentials that would result in unmanaged currents.

In the cases of auxiliary power or redundant power feeds, other power management must be employed. The system provides a mechanism for performing this power management by allowing power feeds to be switched on or off in addition to setting current trip levels times. In addition, because the Vhub modules can communicate with each other and other modules on the system, one Vhub module can request that another one turn off power to a given output, thereby give it the ability to control which direction power is fed from. Inherent in this ability is the ability to turn on power feeds to replace a severed power feed. This provides power redundancy.

In addition to the physical ability of the modules to switch power and communicate with each other, the ability for the modules to identify which modules they are supplying power to helpful in the management of power. By using the Mapping ability outlined below, a module can respond to or notify another module of which devices it is supplying power to. This information is used to turn off redundant power paths in the notified or querying module if it sees that it is supplying power to the same module.

In the previous sections, the discovery of modules was described. In accordance with a further embodiment, a system and method for mapping those discovered modules is described. In particular, once a Vhub module has performed discovery as previously described, it performs the following actions ("mapping process") to determine the system topology:

Each module that supports topology mapping (e.g., Vhub/Vpower modules), called a "TMS" or mapping module, performs the following process each time a module is discovered (new or moved) or is no longer in the discovered list.

During the discovery process, a list of modules (chain) is built for each port on each VEEDIMS module. These lists will be used to build up the topology (By definition, always a tree after the RSTP is run). The basic theory of operation is to count the number of modules that appear in common between the querying module and the responding module. This gives a "distance" in number of modules. This "distance" is used to place the module in the proper context of the topology. Here are two methods of implementing this algorithm that are currently being used.

One embodiment of a mapping process is as follows:
1. For each TMS module, build a topology of the modules on each of its output ports up to and including the next TMS module or terminal module:
2. For each port on this TMS module:
    a. Prune list to those modules between this one and the next TMS module:
        i. For each discovered TMS module on the chain:
            1. Request module chain of return port.
            2. Do an intersection of the outgoing port chain and the return port chain to get a resulting common module chain. Common modules are those that appear in the module list of both the outgoing port of the mapping module and the return port of the module in question.
            3. Choose the TMS module that has the least number of common modules.
                a. Add all the modules from the common module chain to the topology for this port with the TMS module last.
        ii. If no module that supports topology mapping (Vhub/Vpower) is found, add all the modules from the outgoing module chain to the topology for this port.
    b. Sort resulting topology chain
        i. For each module in topology chain except the TMS module or terminal module (they are always at the end of the chain), if present, count modules in common.
            1. Request module chain of return port.
            2. Do an intersection of the outgoing port chain and the return port chain to get a resulting common module chain. Common modules are those that appear in the module list of both the outgoing port of the mapping module and the return port of the module in question.
        ii. Sort module chain ascending by number of modules in common chain.
        iii. Any modules that do not return a return port chain or do not support mapping get placed at end of list (before the TMS or terminal module) in the same order that they were discovered.

Another embodiment of a mapping process is as follows:
1. For each module port:
2. For each module discovered on this port perform the following checks:
    a. If it is a terminal module, place it last on the chain.
    b. If it does not have (Mapping Support field in discovery response), place it at end of the chain before any terminal module
    c. For all others, ask the module for a list of modules on the port that it responded on initially (That is the port that connects to this module).
        i. Prune returned list to those that also exist in our discovered list for this port. This gives us a list of modules that are between this module and the one being queried.
        ii. Insert in list at index based on length of remaining pruned list.
        iii. If no response is received (assumed that mapping support is not available) or a response with the number of records set to −1 is received (mapping is not supported by this module), the module is placed at the end of the chain before any terminal module.

Regardless of which mapping process above is used, this will result in an ordered list of the chain of modules on each port of this Vhub/Vpower module.

Send the Mapping Master a notification that mapping is complete for this module.

Each Vhub/Vpower module will perform a mapping cycle if it detects a change in the modules on a port during a discovery. Only ports that changes are detected on will need to be remapped.

For performance reasons, it is recommended that Vhub/Vpower module wait N/(number of ports+1) seconds between processing each port to even out the network and processing load.

Map Reporting may be performed in accordance with additional embodiments. Each Vhub/Vpower module will provide XML output at http://<module IP>/topology.xml. The format of the xml produced as described by the Map Reporting XML schema. This file can be read by Mapping Master to determine the topology of the system.

An example Map Reporting XML schema is as follows:

```xml
<?xml version="1.0" encoding="utf-8"?>
<xs:schema xmlns:xs="http://www.w3.org/2001/XMLSchema"
           targetNamespace="http://VEEDIMS.com"
           xmlns:adam="http://VEEDIMS.com"
           elementFormDefault="qualified"
>
  <xs:simpleType name="typeMACaddress">
    <xs:restriction base="xs:string">
      <xs:pattern value="^([0-9a-fA-F][0-9a-fA-F]:){5}([0-9a-fA-F][0-9a-fA-F])$" />
    </xs:restriction>
  </xs:simpleType>
  <xs:simpleType name="typeIPaddress">
    <xs:restriction base="xs:string">
      <xs:pattern value="((1?[0-9]?[0-9]|2[0-4][0-9]|25[0-5]).){3}(1?[0-9]?[0-9]|2[0-4][0-9]|25[0-5])" />
    </xs:restriction>
  </xs:simpleType>
  <xs:simpleType name="typeVersion">
    <xs:restriction base="xs:string">
      <xs:pattern value="^[0-9]+\.[0-9]+$" />
    </xs:restriction>
  </xs:simpleType>
  <!-- format = 2011-04-20 09:23 -->
  <xs:simpleType name="typeBuildTime">
    <xs:restriction base="xs:string">
      <xs:pattern value="([0-9]){4}\-([0-9]){2}\-([0-9]){2} ([0-9]){2}:([0-9]){2}" />
    </xs:restriction>
  </xs:simpleType>
  <xs:complexType name="typeModule">
    <xs:sequence>
      <xs:element name="moduleclass" type="xs:byte" minOccurs="1" maxOccurs="1"></xs:element>
      <xs:element name="MACaddress" type="adam:typeMACaddress" minOccurs="1" maxOccurs="1"></xs:element>
      <xs:element name="IPaddress" type="adam:typeIPaddress" minOccurs="1" maxOccurs="1"></xs:element>
      <xs:element name="version" type="adam:typeVersion" minOccurs="1" maxOccurs="1"></xs:element>
      <xs:element name="buidtime" type="adam:typeBuildTime" minOccurs="1" maxOccurs="1"></xs:element>
      <xs:element name="platform" type="xs:string" minOccurs="1" maxOccurs="1"></xs:element>
      <xs:element name="application" type="xs:string" minOccurs="1" maxOccurs="1"></xs:element>
      <xs:element name="power" type="xs:float" minOccurs="1" maxOccurs="1"></xs:element>
        <xs:sequence minOccurs="0" maxOccurs="unbounded">
          <xs:element name="port">
            <xs:complexType>
              <xs:sequence minOccurs="0" maxOccurs="unbounded">
                <xs:element name="childModule" type="adam:typeModule" />
              </xs:sequence>
            </xs:complexType>
          </xs:element>
        </xs:sequence>
    </xs:sequence>
  </xs:complexType>
  <xs:element name="topology" type="adam:typeModule" nillable="false"></xs:element>
</xs:schema>
```

An example Map Reporting XML is as follows:

```xml
<?xml version="1.0" encoding="utf-8"?>
<topology xmlns="http://VEEDIMS.com">
  <!-- VEEDIMS ADAM Topology Report-->
  <moduleclass>0</moduleclass>
  <MACaddress>06:05:04:03:02:01</MACaddress>
  <IPaddress>10.0.0.1</IPaddress>
  <version>1.0</version>
  <buidtime>2011-04-20 09:23</buidtime>
  <platform>SBL2e</platform>
  <application>Vhub test code</application>
  <power>45.5</power>
  <port>
    <childModule>
      <moduleclass>0</moduleclass>
      <MACaddress>23:23:23:23:23:24</MACaddress>
      <IPaddress>1.1.1.2</IPaddress>
      <version>1.01</version>
      <buidtime>2011-04-20 01:23</buidtime>
      <platform>SBL2e</platform>
      <application>Vsensor</application>
      <power>3.5</power>
      <port>
        <childModule>
          <moduleclass>0</moduleclass>
          <MACaddress>23:23:23:23:23:24</MACaddress>
          <IPaddress>1.1.1.2</IPaddress>
          <version>1.01</version>
```

-continued

```
            <buidtime>2011-04-20 01:23</buidtime>
            <platform>SBL2e</platform>
            <application>Vsensor</application>
            <power>3.5</power>
          </childModule>
          <childModule>
            <moduleclass>0</moduleclass>
            <MACaddress>23:23:23:23:23:24</MACaddress>
            <IPaddress>1.1.1.2</IPaddress>
            <version>1.01</version>
            <buidtime>2011-04-20 01:23</buidtime>
            <platform>SBL2e</platform>
            <application>Vsensor</application>
            <power>3.5</power>
          </childModule>
          <childModule>
            <moduleclass>0</moduleclass>
            <MACaddress>23:23:23:23:23:24</MACaddress>
            <IPaddress>1.1.1.2</IPaddress>
            <version>1.01</version>
            <buidtime>2011-04-20 01:23</buidtime>
            <platform>SBL2e</platform>
            <application>Vsensor</application>
            <power>3.5</power>
          </childModule>
        </port>
        <port>
        </childModule>
          <moduleclass>0</moduleclass>
          <MACaddress>23:23:23:23:23:24</MACaddress>
          <IPaddress>1.1.1.2</IPaddress>
          <version>1.01</version>
          <buidtime>2011-04-20 01:23</buidtime>
          <platform>SBL2e</platform>
          <application>Vsensor</application>
          <power>3.5</power>
          <port>
            <childModule>
              <moduleclass>0</moduleclass>
              <MACaddress>23:23:23:23:23:24</MACaddress>
              <IPaddress>1.1.1.2</IPaddress>
              <version>1.01</version>
              <buidtime>2011-04-20 01:23</buidtime>
              <platform>SBL2e</platform>
              <application>Vsensor</application>
              <power>3.5</power>
            </childModule>
            <childModule>
              <moduleclass>0</moduleclass>
              <MACaddress>23:23:23:23:23:24</MACaddress>
              <IPaddress>1.1.1.2</IPaddress>
              <version>1.01</version>
              <buidtime>2011-04-20 01:23</buidtime>
              <platform>SBL2e</platform>
              <application>Vsensor</application>
              <power>3.5</power>
            </childModule>
            <childModule>
              <moduleclass>0</moduleclass>
              <MACaddress>23:23:23:23:23:24</MACaddress>
              <IPaddress>1.1.1.2</IPaddress>
              <version>1.01</version>
              <buidtime>2011-04-20 01:23</buidtime>
              <platform>SBL2e</platform>
              <application>Vsensor</application>
              <power>3.5</power>
            </childModule>
          </port>
        </childModule>
      </port>
    </childModule>
  </port>
  <port>
  </port>
  <port>
    <childModule>
      <moduleclass>0</moduleclass>
      <MACaddress>23:23:23:23:23:24</MACaddress>
      <IPaddress>1.1.1.2</IPaddress>
      <version>1.01</version>
      <buidtime>2011-04-20 01:23</buidtime>
      <platform>SBL2e</platform>
      <application>Vsensor</application>
      <power>3.5</power>
      <port>
        <childModule>
          <moduleclass>0</moduleclass>
          <MACaddress>23:23:23:23:23:24</MACaddress>
          <IPaddress>1.1.1.2</IPaddress>
          <version>1.01</version>
          <buidtime>2011-04-20 01:23</buidtime>
          <platform>SBL2e</platform>
          <application>Vsensor</application>
          <power>3.5</power>
        </childModule>
      </port>
      <port>
        <childModule>
          <moduleclass>0</moduleclass>
          <MACaddress>23:23:23:23:23:24</MACaddress>
          <IPaddress>1.1.1.2</IPaddress>
          <version>1.01</version>
          <buidtime>2011-04-20 01:23</buidtime>
          <platform>SBL2e</platform>
          <application>Vsensor</application>
          <power>3.5</power>
        </childModule>
      </port>
    </childModule>
  </port>
  <port>
  </port>
  <port>
  </port>
</topology>
```

It will be appreciated by those skilled in the art having the benefit of this disclosure that this system and method for auto-discovery and mapping of networked modules provides a improved method for forming a data and power network from a set of connected modules. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method of performing automated discovery and mapping of the topology of a network of interconnected hub modules and sensor modules, wherein the sensor modules include discovery and mapping-enabled sensor modules and standard sensor modules that are not discovery and mapping-enabled and wherein the network connections for the hub modules and the sensor modules include both data connections and power connections, the method comprising the following steps:

a) providing a plurality of the hub modules, each hub module having a data and power input port connected to the network, a data and power output port, a power switch operatively connected on a power feed line between the input port and the output port and a data switch operatively connected on a data line between the input port and the output port;

b) providing a plurality of sensor modules, each sensor module having a first data and power input/output port operatively connected to the network via the data and power output port of the one the hub modules, and a data switch operatively connected on a data line from the first input/output port;

c) powering up all discovery and mapping-enabled sensor modules on the network with current trips of the hub modules set to maximum level;

d) powering up all standard sensor modules;

e) determining what hub modules and sensor modules are on the network;

f) determining the topology of the network, including where the hub modules and the sensor modules are connected within the network;

g) using the determined topology to determine power requirements for the sensor modules connected to the data and power output ports of each hub module on the network; and h) adjusting the power distribution on the network using the power switches in the hub modules to accommodate the identified power needs of the network.

2. A method in accordance with claim 1, wherein the step b) powering up all standard modules further comprises the steps of:

i) powering up a first connected module to a minimal level;

ii) setting the power of the first connected module to a requested value; and iii) repeating steps i) and ii) for each subsequent module in a chain.

3. A method in accordance with claim 1, wherein the step b) powering up all standard modules further comprises the steps of:

i) power up all connected modules in low power state;

ii) determining if the hub module can supply full power to all connected modules; and iii) setting all connected modules to full power once it is determined that the hub module can supply full power.

4. A method in accordance with claim 1, wherein the step b) powering up all standard modules further comprises the step of using an extra pair of power conductors to power the electronics of the modules such that power requirements can be determined before powering up the entire module.

5. A method in accordance with claim 1, further comprising the step of using the auto-discovery of the modules to feed the auto-configuration of the controllers and upper level systems.

6. A method in accordance with claim 1, further comprising the step of continuously monitoring the network after initial discovery and mapping to determine if changes to the topology have occurred.

7. A method in accordance with claim 6, further comprising responding to changes in the network topology by automatically reconfiguring the power and/or data connections of the network.

* * * * *